United States Patent [19]
Coda et al.

[11] Patent Number: 5,563,413
[45] Date of Patent: Oct. 8, 1996

[54] FOCUS TEST METHOD FOR STARING AND UNDERSAMPLED SENSORS

[75] Inventors: Robert J. Coda, Los Angeles; Donald F. King, Playa del Rey, both of Calif.

[73] Assignee: Hughes Electronics, Los Angeles, Calif.

[21] Appl. No.: 403,608

[22] Filed: Mar. 14, 1995

[51] Int. Cl.⁶ .................................................... G03B 3/00
[52] U.S. Cl. .................. 250/332; 250/201.4; 250/208.1
[58] Field of Search ........................ 250/332, 252.1 A, 250/201.4, 208.1, 216

[56] References Cited

U.S. PATENT DOCUMENTS

| | | | |
|---|---|---|---|
| 3,986,384 | 10/1976 | Giorgi | 250/252.1 A |
| 4,009,386 | 2/1977 | Deml et al. | 250/201.4 |
| 4,701,605 | 10/1987 | Ida | 250/208.1 |
| 5,265,958 | 11/1993 | Ludlow | 250/252.1 A |
| 5,404,013 | 4/1995 | Tajima | 250/332 |

*Primary Examiner*—Carolyn E. Fields
*Attorney, Agent, or Firm*—Michael W. Sales; Wanda K. Denson-Low

[57] ABSTRACT

A system (10) for focusing an array (12) of detectors. The invention (10) includes a target (16) disposed in the line-of-sight of the array (12). In accordance with the invention, the target (16) has a plurality of elongate apertures therein. The target (16) is mounted about the line-of-sight of the array relative to an axis extending through the plane of the input aperture of the array and transverse to the line of sight. The array (12) is sampled to provide a plurality of output signals. The output signals have amplitude minima and maxima corresponding to the detection of the apertures by individual detectors in the array (12). The maxima of the output signals are used to focus the array (12).

6 Claims, 2 Drawing Sheets

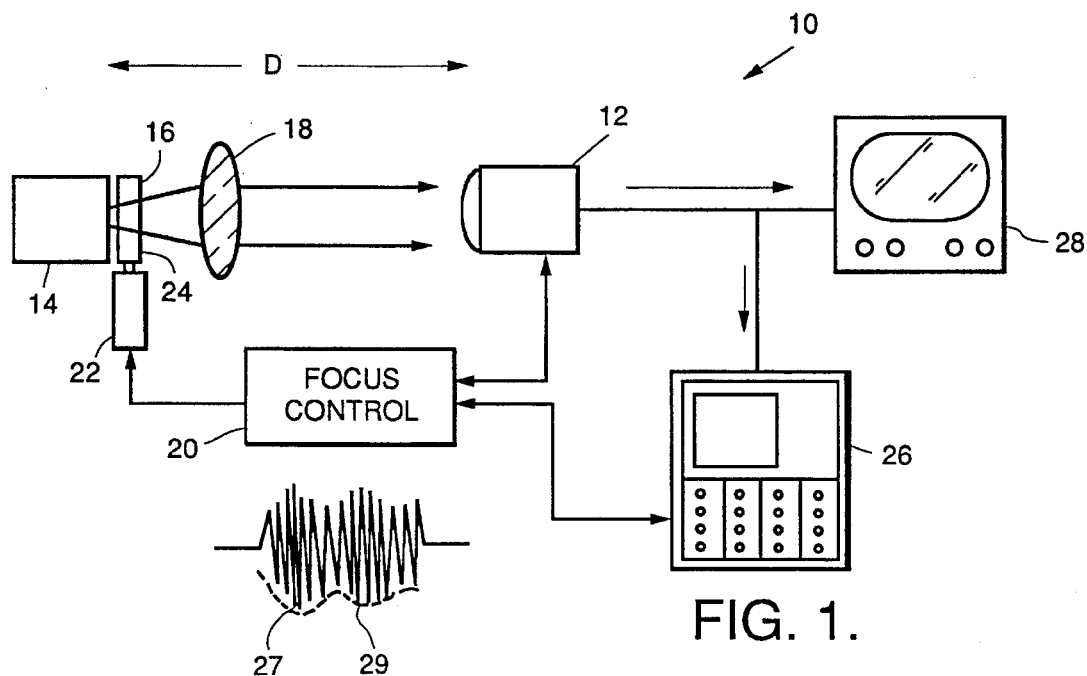
FIG. 1.
FIG. 4.
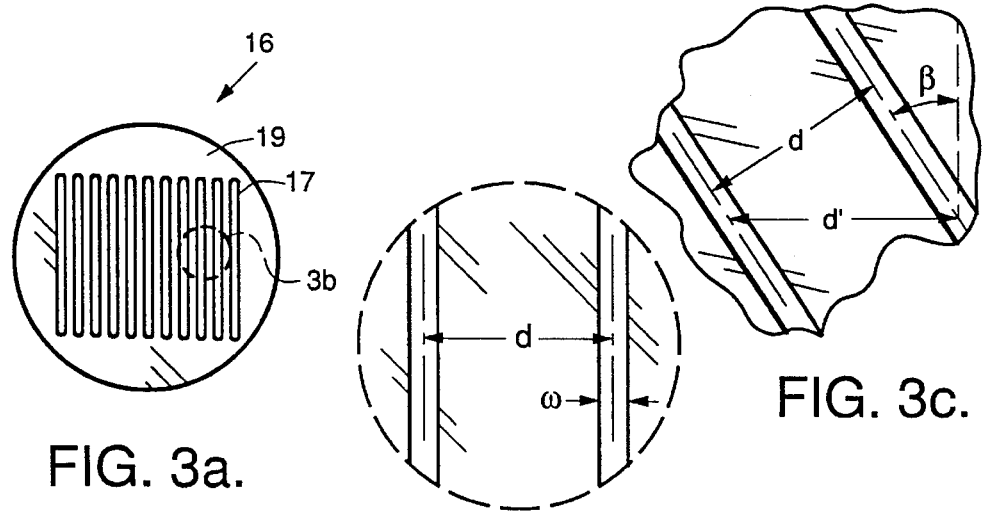
FIG. 3a.
FIG. 3b.
FIG. 3c.

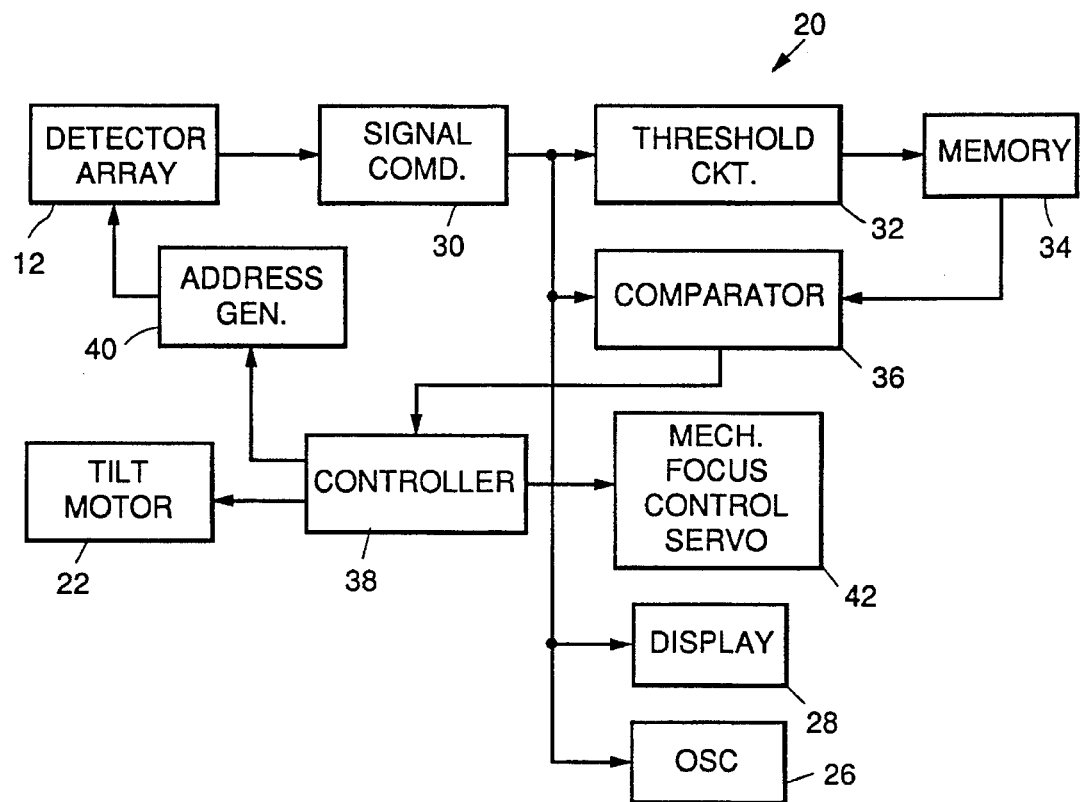
FIG. 5.
FIG. 2.
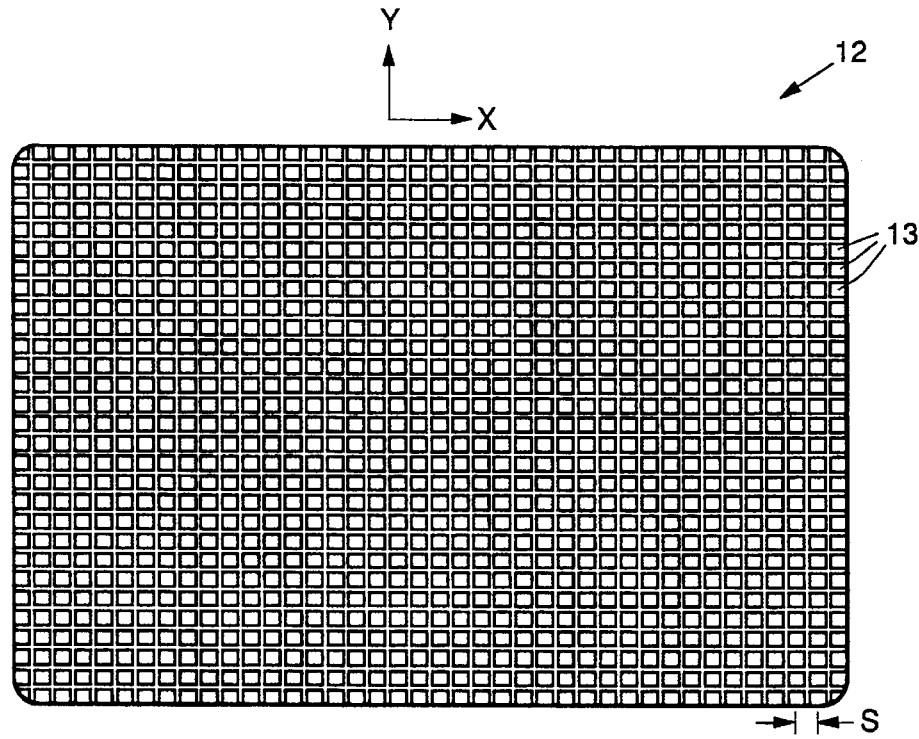

FOCUS TEST METHOD FOR STARING AND UNDERSAMPLED SENSORS

BACKGROUND OF THE INVENTION

1. Field of the Invention

The present invention relates to imaging systems. More specifically, the present invention relates to systems and techniques for focusing staring and undersampled sensors.

2. Description of the Related Art

In certain complex, high precision optical systems, focusing is problematic as small image shifts may occur as the optical elements are moved. For an undersampled sensor (such as a staring sensor), these shifts can cause the relative phasing or displacement between the detectors and a target to change. When a conventional single slit or edge focusing target is used, such a change in phasing can cause the slit image to appear to go in and out of focus. This effect can make focusing an arduous and iterative process, unsuitable for automation.

Thus, there is a need in the art for a system and technique for mitigating the effect of phase changes on the focusing of staring and undersampled sensors.

SUMMARY OF THE INVENTION

The need in the art is addressed by the present invention which provides a system for focusing an array of detectors in a sensor. The invention includes a target disposed in the line-of-sight of the array. In accordance with the invention, the target has a plurality of elongate apertures therein. The target is mounted at an angle about the line-of-sight of the array relative to an axis extending through the plane of the input aperture of the array and transverse to the line of sight. The array is sampled to provide a plurality of output signals. The output signals have amplitude minima and maxima corresponding to the detection of the apertures by individual detectors in the array. The maxima of the output signals are used to focus the array. In accordance with a specific embodiment, the width of each of the apertures is less than the field of view of at least one of the detectors at the plane of the target.

BRIEF DESCRIPTION OF THE DRAWINGS

FIG. 1 is a diagram of a test setup arrangement for a staring sensor.

FIG. 2 is a magnified view of the detector array.

FIG. 3(a) is a front view of the multiple slit target of the present invention.

FIG. 3(b) is a magnified view of two slits of the target of FIG. 3(a).

FIG. 3(c) is a magnified view of two slits of the target of FIG. 3(a) at an angle β relative to vertical.

FIG. 4 depicts an illustrative oscilloscope trace of the output of the sensor for a single video line across the multiple slit target.

FIG. 5 is block diagram of an illustrative implementation of the focus control system.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a diagram of a test setup arrangement for a staring sensor. FIG. 2 is a front view of the sensor. As shown in FIG. 1, the arrangement 10 includes a staring sensor under test 12. As best illustrated in FIG. 2, the sensor 12 incorporates a two-dimensional array of detector elements 13. In the illustrative embodiment, the sensor 12 is an infrared sensor.

Returning to FIG. 1, a conventional blackbody radiation source 14 is disposed in the line of sight of the sensor 12 as is common in the art. The blackbody source temperature is adjusted so that the target is clearly imaged by the sensor without saturation. In accordance with conventional teachings, a target with a single slit or aperture would be mounted between the source 14 and the sensor 12. However, as mentioned above, the use of a single slit target is problematic because in certain complex, high precision optical systems, focusing is problematic as small image shifts may occur as the elements are moved. For a sampled sensor (such as a staring sensor), these shifts can cause the relative phasing or displacement between the detectors and a target to change. When a conventional single slit or edge focusing target is used, such a change in phasing can cause the slit image to appear to go in and out of focus. This effect can render the focusing operation an arduous and iterative process, unsuitable for automation.

This problem is addressed by the target 16 of the present invention when used in accordance with the novel focusing method described herein. In accordance with the present teachings, the conventional single slit target is replaced by a multiple slit target 16.

FIG. 3(a) is a front view of the multiple slit target of the present invention. FIG. 3(b) is a magnified view of two slits of the target of FIG. 3(a). FIG. 3(c) is a magnified view of two slits of the target of FIG. 3(a) at an angle β relative to vertical. Each slit 17 is an elongate aperture which is machined or otherwise fabricated in a metal plate 19. FIGS. 3(b) and (c) illustrate a single row of detectors. The output of a row is monitored on an oscilloscope as discussed below.

As illustrated in FIGS. 3(b) and (c), non-tilted detectors see slit spacing at 'd' and tilted detectors see slit spacings at d'=d/cosβ. Optimum target slit dimensions depend upon both focal length of the projection optics, detector field-of-view, and detector spacing of the specific sensor to be tested. The effective width 'w' of each of the slits is substantially less than the field of view of a single detector in the array at the distance D at which the target is mounted relative to the sensor 12. The number of slits and the height of the slits, beyond the recommended minimum, should be chosen to cover the area over which focus is to optimized. In accordance with the present teachings, the slit widths are 30% to 60% of the detector fields-of-view at the target placement distance, the slit spacings are 60% to 80% of the detector spacings, and the slit heights are at least 20% of the entire sensor vertical field-of-view. This is effective to create a beating relationship between the frequency represented by target slits and the frequency represented by detector spacings. (If necessary to better match the sensor under test, the apparent slit spacing of a given multi-slit pattern (as seen by a given row of detectors) can be increased somewhat by rotating it in the plane of the target plate. The effective slit spacing can be increased by a factor of 1/cos β if the target is rotated at an angle of β from vertical.)

In this orientation, energy from the source 14, which passes through the target 16, is focused by collimating projection optics 18 and received by the sensor 12. The projection optics 18 create an appearance of the target at a desired focus distance from the sensor 12.

The output of the sensor 12 may be input to a focus control unit 20 for automatic focus control or to an oscilloscope 26 or a video display 28.

FIG. 4 depicts an illustrative oscilloscope trace of the output of the sensor 12 for a single video line across the multiple slit target 16. The output of each row of detector elements 13 will look similar to that shown in FIG. 4. Since the detector spacing does not exactly match the target slit spacing, the sensor's response to the target will be a series of narrow/tall peaks (corresponding to the detector and slit being in phase), short/broad peaks (corresponding to the detector detector and slit out of phase), and combinations between the two extremes corresponding to intermediate phases. The tall peaks 27 in the output signal correspond to locations at which a detector element 13 is aligned with a slit 17 in the target 16. As the phasing shifts, the peaks shift. When the amplitudes of the peaks begins to diminish, the point of optimal focus has been exceeded. Hence, the sensor focus may be optimized by maximizing the amplitudes of the envelope of the tallest peaks in the oscilloscope trace. As the detector elements 13 are focused, some displacement in the x-y plane occurs. In a conventional focusing system, this displacement would require a rephasing of the detectors and a refocusing of same. This conventional iterative process is difficult to automate.

The method of the present invention is unaffected by small image shifts during focusing. Such shifts may cause the peaks to shift position somewhat, but some detectors will always be optimally phased with some slits and maximizing the amplitudes of the tallest peaks will ensure optimum focus. The amplitude of the tallest peaks will become larger as focus improves and smaller as focus degrades. The location of these tallest peaks will shift with phasing changes between the detector array and target, but their average amplitude will not change significantly.

FIG. 5 is block diagram of an illustrative implementation of the focus control system 20. The system 20 includes a signal conditioning circuit 30 which amplifies and filters the output of the detector in the array 12 in a conventional manner. The detector outputs are input to a thresholding circuit 32. Maxima exceeding the threshold are stored in a memory 34. These signals are compared to instantaneous detector outputs by a comparator 36. The output of the comparator is input to a controller or microprocessor 38. The controller 38 addresses individual detectors in the sensor array 12 via an address generator 40 and provides focus control drive signals to a conventional mechanical focus control servo 42. The conditional sensor output signals may also be provided to the oscilloscope 26 or the display 28.

As an option, a tilt motor 22 may adjust the angle β of the target via a coupling or gear under command of the controller 38. However, it should not be necessary to dynamically adjust β. It should remain constant for any particular sensor design (i.e. best angle => best effective slit spacing => dependent on detector spacing and sensor optics focal length/magnification.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for focusing an array of detectors, the array having an input aperture and said system comprising:

a target disposed in the line of sight of the array, said target providing a plurality of elongate source elements;

first means for mounting the target about the line of sight of the array relative to an axis extending through the plane of the input aperture of said array transverse to said line of sight;

second means for sampling said array and providing a plurality of output signals in response thereto, said output signals having amplitude minima and maxima corresponding to the detection of said elements by individual detectors in said array; and third means for focusing said array in response to the maxima of said array output signals.

2. The invention of claim 1 wherein the width of each of said elements is less than the field of view of at least one of said detectors at the plane of said target.

3. The invention of claim 2 wherein said detectors are infrared detectors.

4. The invention of claim 3 wherein said target is mounted between said array and a blackbody radiation source.

5. The invention of claim 4 wherein said elongate source elements are apertures in a plate.

6. A method for focusing an array of detectors, said array having an input aperture, said method including the steps of:

placing a target in the line of sight of the array, said target having a plurality of elongate apertures therein;

mounting the target about the line of sight of the array relative to an axis extending through the plane of the input aperture of said array and transverse to said line of sight;

sampling said array and providing a plurality of output signals in response thereto, said output signals having amplitude minima and maxima corresponding to the detection of said apertures by individual detectors in said array; and focusing said array in response to the maxima of said array output signals.

* * * * *